(12) United States Patent
Shibuya et al.

(10) Patent No.: US 9,093,931 B2
(45) Date of Patent: Jul. 28, 2015

(54) DRIVING APPARATUS AND STOP POSITION DETECTION METHOD

(75) Inventors: Shinji Shibuya, Gunma-ken (JP);
Tamotsu Iwazaki, Gunma-ken (JP);
Sadami Hino, Gunma-ken (JP)

(73) Assignee: Mitsuba Corporation, Kiryu-shi (JP)

( * ) Notice: Subject to any disclaimer, the term of this patent is extended or adjusted under 35 U.S.C. 154(b) by 0 days.

(21) Appl. No.: 13/486,610

(22) Filed: Jun. 1, 2012

(65) Prior Publication Data

US 2013/0043817 A1    Feb. 21, 2013

(30) Foreign Application Priority Data

Jun. 2, 2011    (JP) ................ 2011-124249

(51) Int. Cl.
*H02P 1/04* (2006.01)
*H02P 27/04* (2006.01)
*H02P 6/00* (2006.01)
*H02P 6/18* (2006.01)
*H02P 23/00* (2006.01)

(52) U.S. Cl.
CPC ........... *H02P 6/002* (2013.01); *H02P 6/182* (2013.01); *H02P 23/0072* (2013.01)

(58) Field of Classification Search
USPC .................. 318/400.3, 400.33, 801
See application file for complete search history.

(56) References Cited

U.S. PATENT DOCUMENTS

| | | | | |
|---|---|---|---|---|
| 6,483,270 B1 * | 11/2002 | Miyazaki et al. | ............ | 318/700 |
| 2008/0048598 A1 * | 2/2008 | Shibuya | ............ | 318/400.1 |
| 2008/0252242 A1 * | 10/2008 | Akama et al. | ............ | 318/400.14 |
| 2009/0009117 A1 * | 1/2009 | Someya et al. | ............ | 318/400.35 |
| 2011/0080127 A1 * | 4/2011 | Akama et al. | ............ | 318/400.21 |
| 2011/0243590 A1 * | 10/2011 | Ito | ............ | 399/51 |
| 2012/0269370 A1 * | 10/2012 | Barti et al. | ............ | 381/323 |

FOREIGN PATENT DOCUMENTS

| | | |
|---|---|---|
| JP | 2009-071926 | 4/2009 |
| JP | 2010-88267 | 4/2010 |

OTHER PUBLICATIONS

Japanese Office Action dated Jan. 6, 2015, issued in JP 2011-124249.

* cited by examiner

*Primary Examiner* — Paul Ip
*Assistant Examiner* — Devon Joseph
(74) *Attorney, Agent, or Firm* — Kenyon & Kenyon LLP (57) ABSTRACT

A driving apparatus including an inverter unit for energizing the coil by switching ON and OFF of the switching element, an energization pattern determination unit for selecting a plurality of energization patterns, each of which indicates a direction of a current that flows through the coil, one by one when driving of a motor is started, and energizing the coil by switching ON and OFF of the switching element based on a selected energization pattern at a duty ratio corresponding to a value of a maximum current capable of being supplied by the power supply apparatus, a current applied time measurement unit for measuring an energization time, which is a time until a value of the current flowing through the coil reaches a predetermined target current value for each energization pattern, and a rotor stop position estimation unit for estimating a position at which the rotor stops.

8 Claims, 9 Drawing Sheets

DRIVING APPARATUS AND STOP POSITION DETECTION METHOD

BACKGROUND OF INVENTION

1. Field of Invention

The present invention relates to a driving apparatus and a stop position detection method.

This application claims priority to and the benefit of Japanese Patent Application No. 2011-124249, filed on Jun. 2, 2011, the disclosure of which are incorporated by reference herein.

2. Description of Related Art

As a brushless motor in which a rotor has a permanent magnet, there is a brushless motor in which driving control is performed in position-sensorless without a position sensor for detecting a position (angle) of the rotor. In this case, the position of the rotor is detected from an edge interval of a pulse signal obtained by inputting an induced voltage, which appears at a motor terminal of an open section (non-energized phase), and an equivalent neutral-point potential to a comparator. Incidentally, there is a possibility that a signal sufficient for detecting the position of the rotor is not obtained because the induced voltage is not generated or is very low when the number of rotations is zero or very small such as when driving of the brushless motor is started.

Therefore, when voltages are sequentially applied to coils of each phase, a stop position of the rotor is detected based on a difference between rising times of currents flowing through the coils of each phase (for example, Japanese Patent Application Publication No. 2009-071926).

However, in technology disclosed in Japanese Patent Application Publication No. 2009-071926, there is a possibility that a large current flows through the coil if magnetic saturation occurs when the voltage is applied to coil of each phase. In this case, there is a possibility that, due to a load on a power supply apparatus such as a storage battery that supplies power to the motor, the stability of the power supply apparatus is impaired such as a voltage of power to be supplied by the power supply apparatus is temporarily reduced.

SUMMARY OF INVENTION

The present invention has been made in view of the above-described circumstances, and an object of the invention is to provide a driving apparatus and a stop position detection method, which can reduce a load on a power supply apparatus that supplies power to a motor in detection of a position of a rotor when driving of a motor is started.

According to a first aspect of the present invention, a driving apparatus, which drives a motor by supplying power from a power supply apparatus to a motor having a stator around which a plurality of coils are wound and a rotor, including: an inverter unit, having a switching element provided for each coil, for energizing the coil by switching ON and OFF of the switching element; an energization pattern determination unit for selecting from a plurality of energization patterns one by one, each of which indicates a direction of a current that flows through the coil, when driving of the motor is started, and energizing the coil by switching ON and OFF of the switching element based on a selected energization pattern at a duty ratio corresponding to a value of a maximum current capable of being supplied by the power supply apparatus; a current applied time measurement unit for measuring an energization time, which is a time until a value of the current flowing through the coil reaches a predetermined target current value for each energization pattern; and a rotor stop position estimation unit for estimating a position at which the rotor stops based on the energization time for each energization pattern measured by the current applied time measurement unit.

According to a second aspect of the present invention, in the driving apparatus according to the first aspect of the present invention, the duty ratio is a ratio of the target current value to the maximum current value of the power supply apparatus.

According to a third aspect of the present invention, in the driving apparatus according to the first or second aspect of the present invention, the target current value is a value of a current that flows when magnetically saturation is occurred at the coil.

According to a fourth aspect of the present invention, in the driving apparatus according to any one of the first to third aspects of the present invention, the energization pattern determination unit designates a position corresponding to the selected energization pattern as the position at which the rotor stops when a time elapsed after energizing of the coil is started using the selected energization pattern is equal to or greater than a predetermined time.

According to a fifth aspect of the present invention, a stop position detection method for use in a driving apparatus, which drives a motor by supplying power from a power supply apparatus to the motor having a stator around which a plurality of coils are wound and a rotor, and has an inverter unit, having a switching element provided for each coil, for energizing the coil by switching ON and OFF of the switching element, including: an energizing step of selecting from a plurality of energization patterns, each of which indicates a direction of a current that flows through the coil, one by one when driving of the motor is started, and energizing the coil by switching ON and OFF of the switching element based on a selected energization pattern at a duty ratio corresponding to a value of a maximum current capable of being supplied by the power supply apparatus; a current applied time measurement step of measuring an energization time, which is a time until a value of the current flowing through the coil reaches a predetermined target current value for each energization pattern; and a rotor stop position estimation step of estimating a position at which the rotor stops based on the energization time for each energization pattern measured in the current applied time measurement step.

According to the above-described aspects of the present invention, the energization pattern determination unit designates a duty ratio at which ON and OFF of each switching element provided in the inverter unit are switched as the duty ratio corresponding to the value of the maximum current capable of being supplied by the power supply apparatus. Thereby, when the position at which the rotor stops is detected if driving of the motor is started, a load on a power supply apparatus can be reduced to a fixed level or less, and the stability of the power supply apparatus can be maintained. As a result, it is possible to suppress a voltage of power supplied by the power supply apparatus being temporarily reduced.

DETAILED DESCRIPTION OF THE PREFERRED EMBODIMENTS

Hereinafter, a driving apparatus and a stop position detection method according to the present embodiment will be described with reference to the drawings.

Figure 1:
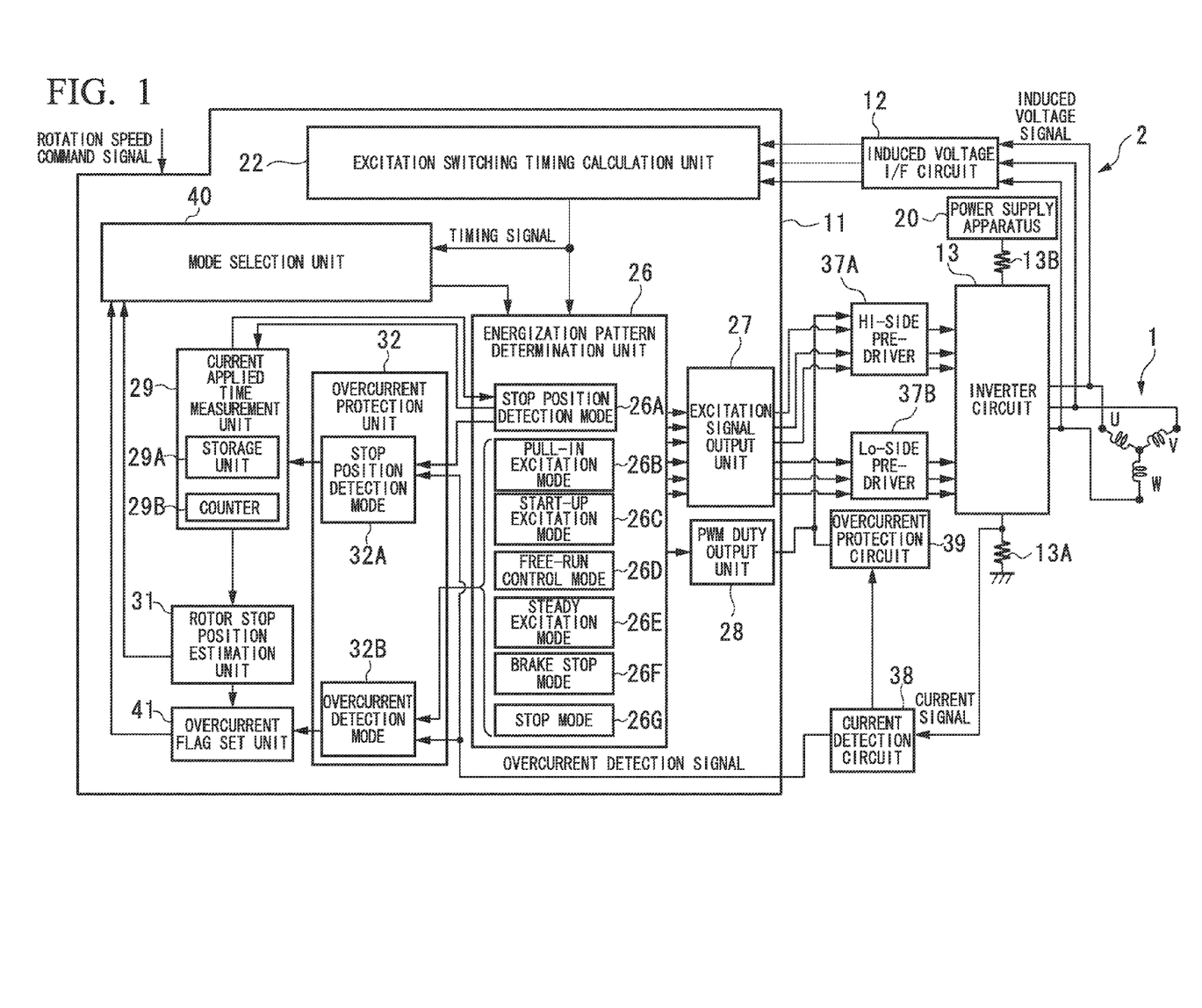
FIG. 1 is a schematic block diagram illustrating a configuration of a motor system according to the present embodiment.

FIG. 1 is a schematic block diagram illustrating a configuration of a motor system according to the present embodiment. As illustrated in FIG. 1, the motor system includes a brushless motor 1 and a driving apparatus 2 that controls driving of the brushless motor 1.

The brushless motor 1 is a sensorless type motor in which there is no sensor that detects a position of a rotor provided in the brushless motor 1. The brushless motor 1 includes the rotor having a permanent magnet and a stator. Coils U, V, and W corresponding to three phases U, V, and W are sequentially wound around the stator in a circumferential direction. The coils U, V, and W of each phase have one ends connected to the driving apparatus 2 via motor terminals and the other ends connected to each other.

The driving apparatus 2 includes a control apparatus 11 having a microcomputer or the like, an induced voltage I/F circuit 12, which detects voltages of the motor terminals connected to the one ends of the coils U, V, and W corresponding to the each phases of the brushless motor 1, an inverter circuit 13, which is a driving circuit having switching elements to switch energizing of the coils U, V, and W, a power supply apparatus 20, which supplies power to the brushless motor 1 via the inverter circuit 13, a high (Hi)-side pre-driver 37A and a low (Lo)-side pre-driver 37B provided between the control apparatus 11 and the inverter circuit 13, a current detection circuit 38, which detects a current that flows through the inverter circuit 13, and an overcurrent protection circuit 39.

Figure 2:
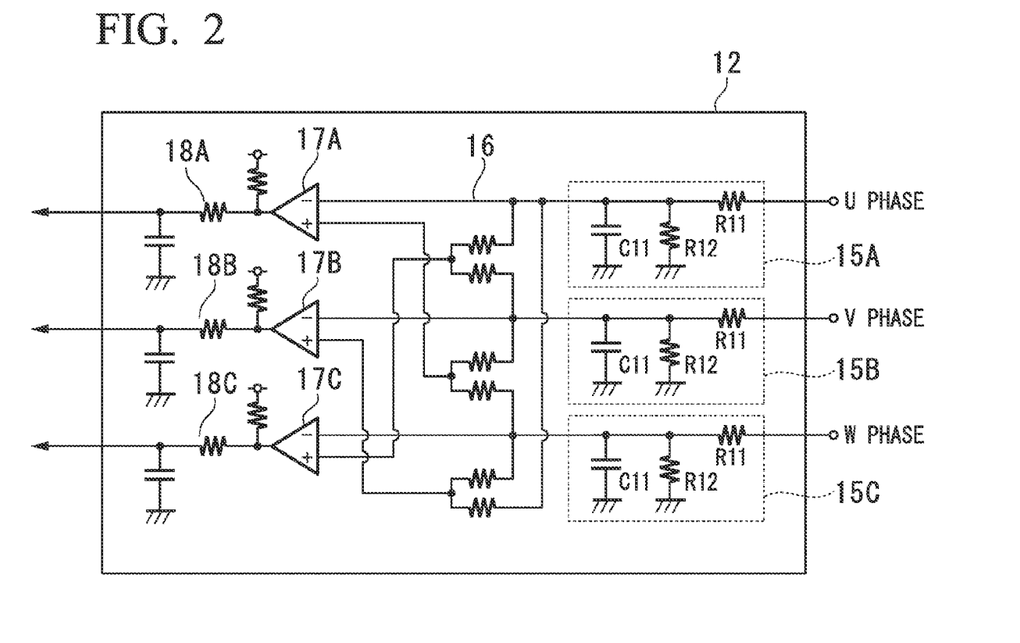
FIG. 2 is a diagram illustrating a configuration example of an induced voltage interface (I/F) circuit 12 according to the present embodiment.

FIG. 2 is a diagram illustrating a configuration example of the induced voltage I/F circuit 12 according to the present embodiment. As illustrated in FIG. 2, the induced voltage I/F circuit 12 includes low-pass filter circuits 15A, 15B, and 15C, each of which includes a voltage dividing circuit (resistors R11 and R12), which receives an induced voltage signal representing a voltage of the motor terminal corresponding to each phase and divides the received induced voltage signal, and a primary capacitor-resistor (CR) filter (the resistor R11 and a capacitor C11), which removes noise of a pulse width modulation (PWM) signal; a circuit 16, which detects an equivalent neutral-point potential; comparators 17A, 17B, and 17C, each of which generates a pulse signal from the equivalent neutral-point potential and a signal indicating an induced voltage that appears in a non-energized phase (open section); and low-pass filter circuits (primary CR filters) 18A, 18B, and 18C, each of which cuts a chattering component from an output of each of the comparators 17A to 17C.

Here, in the circuit 16 that detects the equivalent neutral-point potential, for example, for the U phase, a two-phase comparison method is adopted to detect the equivalent neutral-point potential from motor-terminal voltages of the V and W phases.

According to the above-described method, an approximately flat voltage is obtained as the equivalent neutral-point potential. A three-phase comparison method may be adopted to obtain the equivalent neutral-point potential using signals of all three phases U, V, and W.

In this case, the equivalent neutral-point potential becomes an approximately triangular wave centered on half a power supply voltage.

Each of the comparators 17A to 17C generates a pulse signal for outputting a low-level signal when an analog signal of an induced voltage is higher than the equivalent neutral-point potential, and generates a pulse signal for outputting a high-level signal when the analog signal of the induced voltage is lower than the equivalent neutral-point potential. In each of the comparators 17A to 17C, pulse signal of resolution of an electrical angle of 120 degrees is generated. These signals are input to the control apparatus 11 via the LPF circuits 18A to 18C.

Figure 3:
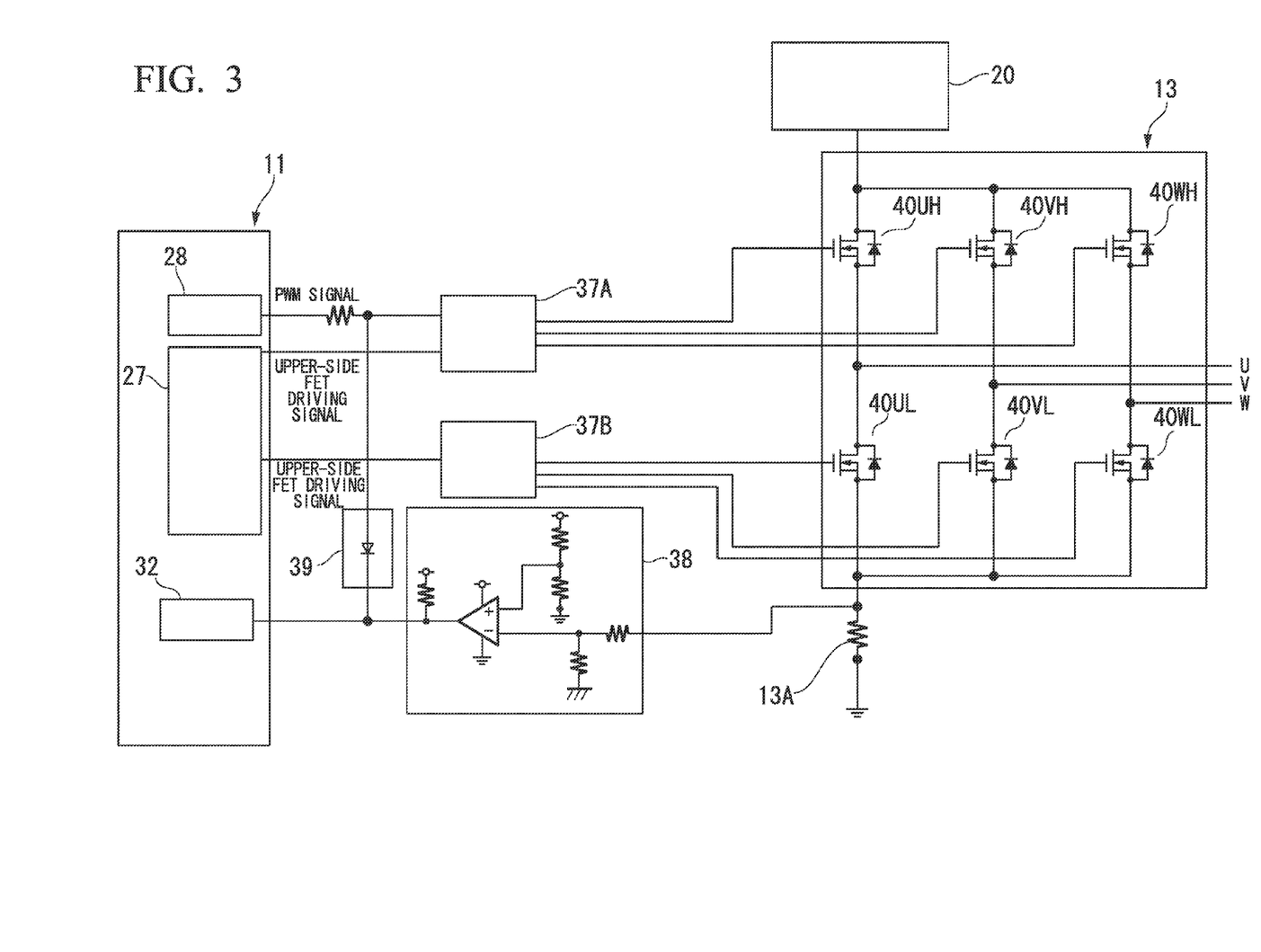
FIG. 3 is a circuit diagram illustrating an example of configurations of an inverter circuit, a current detection circuit, and an overcurrent protection circuit according to the present embodiment.

FIG. 3 is a circuit diagram illustrating an example of configurations of the inverter circuit 13, the current detection circuit 38, and the overcurrent protection circuit 39 according to the present embodiment. As illustrated in FIG. 3, the inverter circuit 13 has six switching elements 40UH, 40UL, 40VH, 40VL, 40WH, and 40WL. The switching elements 40UH and 40UL connected in series, the switching elements 40VH and 40VL connected in series, and the switching elements 40WH and 40WL connected in series are connected in parallel between a positive terminal and a negative terminal in the power supply apparatus 20. In addition, a connection point of the switching elements 40UH and 40UL is connected to one end of the coil U. A connection point of the switching elements 40VH and 40VL is connected to one end of the coil V. A connection point of the switching elements 40WH and 40WL is connected to one end of the coil W.

In addition, the inverter circuit 13 converts a direct current voltage supplied from the power supply apparatus 20 into an alternating current voltage based on a PWM signal (driving signal) input from the control apparatus 11 via the Hi-side pre-driver 37A and the Lo-side pre-driver 37B, and applies the alternating current voltage to the coils U, V, and W of the brushless motor 1.

The switching elements 40UH to 40WL provided in the inverter circuit 13 have a configuration in which, for example, field effect transistors (FETs) or insulated gate bipolar transistors (IGBTs) or the like, and reflux diodes are connected in parallel.

A shunt resistor 13A is provided between the inverter circuit 13 and a ground level (ground potential). By using the shunt resistor 13A, it is possible to detect a current flowing through the inverter circuit 13, that is, a current input to the brushless motor 1, using the current detection circuit 38.

In addition, a shunt resistor 13B is provided between the inverter circuit 13 and the power supply apparatus 20. The current detection circuit 38 may detect a current input to the brushless motor 1 based on a potential of a high potential side of the shunt resistor 13A. The current detection circuit 38 may detect the current input to the brushless motor 1 based on a potential of a low potential side of the shunt resistor 13B.

The current detection circuit 38 is a current comparison means having a comparator. The current detection circuit 38 determines whether or not a current flowing through the inverter circuit 13 is equal to or greater than a predetermined target voltage, and outputs a signal corresponding to the determination result. In the current detection circuit 38, the target voltage is input to an input terminal of a positive side of the comparator, and a voltage of the shunt resistor 13A is input to a terminal of a negative side. That is, if a voltage generated by a current flowing through the shunt resistor 13A reaches the target voltage, the above-described comparator outputs a current detection signal indicating that the current flowing through the inverter circuit 13 is equal to or greater than a target current value as an output of the current detection circuit 38. The output of the current detection circuit 38 is output to the control apparatus 11 and the overcurrent protection circuit 39.

Here, the target voltage is a voltage predetermined according to the target current value. The target voltage is a voltage applied to both ends of the shunt resistor 13A when a current of the target current value flows through the shunt resistor 13A.

The target current value is a value of a current that flows when magnetic saturation is caused by two coils when the two coils of the phase coils U, V, and W of the brushless motor 1 are selected and energized.

The overcurrent protection circuit 39 is configured, for example, using a diode. When the current detection circuit 38 detects that a current flowing through the inverter circuit 13 is equal to or greater than the target current value, the current flows through the diode of the overcurrent protection circuit 39 and a PWM signal, which is output from the PWM duty output unit 28 provided in the control apparatus 11 to the Hi-side pre-driver 37A has a low level (for example, a ground potential). Thereby, when a current that is equal to or greater than the target current value flows to the brushless motor 1 through the inverter circuit 13, the overcurrent protection circuit 39 prevents the switching elements 40UH, 40VH, and 40WH of the high potential sides from being turned on.

The control apparatus 11 will be described with reference back to FIG. 1

The control apparatus 11 has an excitation switching timing calculation unit 22, a mode selection unit 40, an energization pattern determination unit 26, an excitation signal output unit 27, the above-described PWM duty output unit 28, an overcurrent protection unit 32, a current applied time measurement unit 29, a rotor stop position estimation unit 31, and an overcurrent flag set unit 41. The control apparatus 11 may be configured by a central processing unit (CPU), a memory and the like.

The energization pattern determination unit 26 determines an energization pattern for each of the coils U, V, and W provided in the brushless motor 1, and outputs a signal indicating the determined energization pattern to the excitation signal output unit 27 and the PWM duty output unit 28. The energization pattern determination unit 26 has a stop position detection mode 26A, a pull-in excitation mode 26B, a start-up excitation mode 26C, a free-run control mode 26D, a steady excitation mode 26E, a brake stop mode 26F, and a stop mode 26G.

The excitation switching timing calculation unit 22 generates a pulse signal having resolution of an electrical angle of 60 degrees from a pulse signal having resolution of an electrical angle of 120 degrees, which is a pulse signal input from the induced voltage I/F circuit 12, so as to calculate an excitation phase according to an induced voltage edge, thereby detecting a position of the rotor.

In addition, the excitation switching timing calculation unit 22 calculates a rotation speed of the rotor based on a time change in the position of the rotor, and calculates a timing at which the energization pattern is switched according to the calculated rotation speed. The excitation switching timing calculation unit 22 outputs a timing signal indicating the calculated timing to the energization pattern determination unit 26 and the mode selection unit 40.

The mode selection unit 40 determines a rotation direction according to whether or not a timing signal is input from the excitation switching timing calculation unit 22, and selects a mode of the energization pattern determination unit 26. When no timing signal is input, the mode selection unit 40 outputs a mode command signal indicating that the brake stop mode 26F is selected to the energization pattern determination unit 26. When the timing signal is input, the mode selection unit 40 outputs a mode command signal indicating that one of the stop position detection mode 26A, the pull-in excitation mode 26B, the start-up excitation mode 26C, the free-run control mode 26D, the steady excitation mode 26E, and the stop mode 26G is selected to the energization pattern determination unit 26.

If a rotation speed command signal begins to be input, the stop position detection mode 26A causes the excitation signal output unit 27 and the PWM duty output unit 28 to control an operation of causing the excitation signal output unit 27 to output a PWM signal for detecting a stop position of the rotor provided in the brushless motor 1.

Based on the stop position of the rotor detected in control by the stop position detection mode 26A, the pull-in excitation mode 26B causes the excitation signal output unit 27 and the PWM duty output unit 28 to control an operation of outputting a PWM signal corresponding to an energization pattern, which pulls the rotor to the stop position.

The start-up excitation mode 26C causes the excitation signal output unit 27 and the PWM duty output unit 28 to control an operation of determining an energization pattern corresponding to the pull-in position of the rotor in control by the pull-in excitation mode 26B and outputting a PWM signal corresponding to the determined energization pattern.

The free-run control mode 26D causes the excitation signal output unit 27 and the PWM duty output unit 28 to control an operation of freely running the brushless motor 1 after energizing by the start-up excitation mode 26C. At this time, the excitation switching timing calculation unit 22 detects the position of the rotor.

In the steady excitation mode 26E, the energization pattern corresponding to the position of the rotor is determined based on an excitation switching timing calculated by the excitation switching timing calculation unit 22 when the brushless motor 1 rotates (freely runs) according to the free-run control mode 26D. In addition, the steady excitation mode 26E causes the excitation signal output unit 27 and the PWM duty output unit 28 to control an operation of outputting a PWM signal corresponding to the determined energization pattern.

The brake stop mode 26F causes the excitation signal output unit 27 and the PWM duty output unit 28 to control an application to the brushless motor 1 at a duty ratio predetermined to be low to an extent to which overcurrent does not occur for a fixed time with respect to two predetermined coils among the coils U, V, and W. According to this control, the rotation is stopped by pulling the rotor to a predetermined position.

Alternatively, the brake stop mode 26F causes the rotor to be stopped by turning on the switching elements 40UL, 40VL, and 40WL provided in the inverter circuit 13 and setting one ends of the coils U, V, and W as the ground potential.

The stop mode 26G causes the excitation signal output unit 27 and the PWM duty output unit 28 to control an operation of turning-off energizing for each of coils U, V, and W of all the phase.

The excitation signal output unit 27 outputs a signal for applying an excitation current to each coil of the brushless motor 1 to the Hi-side pre-driver 37A and the Lo-side pre-driver 37B according to control by the energization pattern determination unit 26.

Based on the rotation speed command signal and the signal output from the energization pattern determination unit 26, the PWM duty output unit 28 determines an energizing ratio (duty ratio) per unit time, and outputs a signal indicating the determined energizing ratio to the Hi-speed pre-driver 37A.

The Hi-side pre-driver 37A generates a signal for switching ON and OFF of the switching elements 40UH, 40VH, and 40WH of the high potential sides corresponding to an energization pattern of a duty ratio determined by the PWM duty output unit 28, which is an energization pattern selected by the energization pattern determination unit 26, and outputs the generated signal to the inverter circuit 13. The Lo-side pre-driver 37B generates a signal for switching ON and OFF of the switching elements 40UL, 40VL, and 40WL of the low potential sides, and outputs the generated signal to the inverter circuit 13. If a value of a current flowing through the inverter circuit 13 reaches a target current value and a signal input from the PWM duty output unit 28 has a low level, the Hi-side pre-driver 37A turns off the switching elements 40UH, 40VL, and 40WL provided in the inverted circuit 13.

The current applied time measurement unit 29 is connected to the stop position detection mode 32A provided in the overcurrent protection unit 32, the stop position detection mode 26A provided in the energization pattern determination unit 26, and the rotor stop position estimation unit 31. The current applied time measuring unit 29 includes a storage unit 29A and a counter 29B. The storage unit 29A stores a count value measured by the counter 29B. The counter 29B starts a count operation by receiving a command from the stop position detection mode 26A. In addition, the counter 29B causes the storage unit 29A to store the count value if a current detection signal is input from the current detection circuit 38 via the stop position detection mode 32A. In addition, the counter 29B resets the count value after a predetermined time has elapsed, and also outputs a signal indicating that the count value has been reset to the stop position detection mode 26A.

Based on the count value stored in the storage unit 29A of the current applied time measurement unit 29, the rotor stop position estimation unit 31 estimates the position of the rotor when the rotor stops or when the rotor rotates at a low speed.

The overcurrent protection unit 32 controls an operation of preventing a current of the target current value or more from flowing through the brushless motor 1 based on the current detection signal input from the current detection circuit 38. In addition, the overcurrent protection unit 32 has a stop position detection mode 32A and an overcurrent detection mode 32B. When the stop position detection mode 26A is selected in the energization pattern determination unit 26, the stop position detection mode 32A is selected. In the stop position detection mode 32A, a signal indicating whether or not a phase current flowing through the coil has reached the target current value is output to the current applied time measurement unit 29 in energizing using the energization patterns #1 to #6. The overcurrent detection mode 32B is selected when the steady excitation mode 26E is selected in the energization pattern determination unit 26. In the overcurrent detection mode 32B, when the current detection signal is input, a value indicating an ON state is set in the overcurrent flag set unit 41.

Next, a motion of the driving apparatus 2 will be described.

Figure 4:
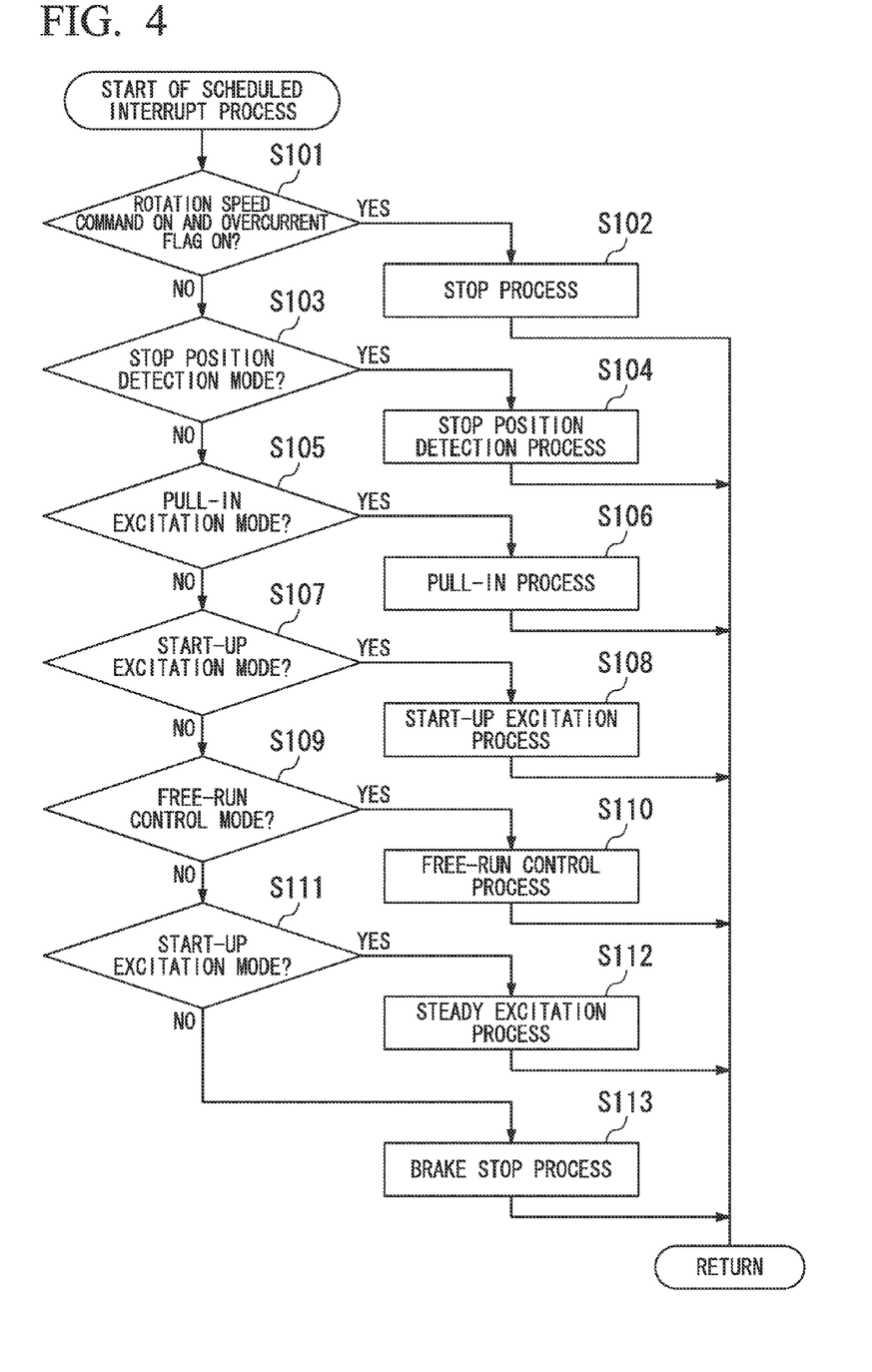
FIG. 4 is a flowchart illustrating a start-up process when a driving apparatus starts driving of a motor.

FIG. 4 is a flowchart illustrating a start-up process when the driving apparatus 2 starts driving of the motor. This start-up process is executed as an interrupt process for a scheduled time.

The mode selection unit 40 determines whether or not a value indicating the ON state is set in the overcurrent flag set unit 41 and the state is the ON state in which the rotation speed command signal is input (step S101). When each is in the ON state (step S101: YES), the mode selection unit 40 causes the energization pattern determination unit 26 to select the stop mode 26G (step S102). At this time, the PWM duty output unit 28 sets a PWM duty ratio to 0%. The control apparatus 11 then ends the start-up process.

When the overcurrent flag set unit 41 is in the OFF state in step S101, or when the rotation command signal is in the OFF state (step S101: NO), the mode selection unit 40 determines whether or not the overcurrent flag set unit 41 is in the OFF state, the rotation speed command signal is in the ON state, and the mode is the stop position detection mode in which a stop position detection process is not completed (step S103). In the case of the stop position detection mode (step S103: YES), the mode selection unit 40 causes the energization pattern determination unit 26 to select the stop position detection mode 26A, thereby executing the stop position detection process (step S104). The control apparatus 11 then ends the start-up process.

When the mode is not the stop position detection mode in step S103, that is, when the stop position detection process is completed (step S103: NO), the mode selection unit 40 determines whether or not the pull-in process is completed (step S105). When the pull-in excitation process is not completed (step S105: YES), the mode selection unit 40 causes the energization pattern determination unit 26 to select the pull-in excitation mode 26B, thereby executing the pull-in process (step S106). The control apparatus 11 then ends the start-up process.

When the pull-in process is completed in step S105 (step S105: NO), the mode selection unit 40 determines whether or not a start-up excitation process is completed (step S107). When the start-up excitation process is not completed (step S107: YES), the mode selection unit 40 causes the energization pattern determination unit 26 to select the start-up excitation mode 26C, thereby executing the start-up excitation process (step S108). The control apparatus 11 then ends the start-up process.

When the start-up excitation process is completed in step S107 (step S107: NO), the mode selection unit 40 determines whether or not a free-run control process is completed (step S109). When the free-run control process is not completed (step S109: YES), the mode selection unit 40 causes the energization pattern determination unit 26 to select the free-run control mode 26D, thereby executing the free-run control process (step S110). The control apparatus 11 then ends the start-up process.

When the free-run control process is completed in step S109 (step S109: NO), the mode selection unit 40 determines whether or not the state is a steady excitation state in which a position of the rotor can be detected based on an induced voltage signal (step S111). In the case of the steady excitation state (step S111: YES), the mode selection unit 40 causes the energization pattern determination unit 26 to select the steady excitation mode 26E, thereby executing the steady excitation process (step S112).

Here, a determination of whether or not the position of the rotor can be detected based on the induced voltage signal is made according to whether or not the excitation switching timing calculation unit 22 has detected the position of the rotor for a predetermined number of times in a row. For example, the state is determined to be the steady excitation state when the excitation switching timing calculation unit 22 can continuously detect the position of the rotor for fourth times in a row.

When the state is not the steady excitation state in step S111 (step S111: NO), the mode selection unit 40 causes the energization pattern determination unit 26 to select the brake stop mode 26F, thereby executing a brake stop process (step S113). At this time, the mode selection unit 40 performs the stop position detection process again after information indicating whether or not each process has been completed is reset and the brake stop process is completed.

Here, in the stop position detection process (step S104), the stop position is determined in consideration of the fact that the magnetic permeability of a core of a magnet increases and hence inductance decreases when a direction of magnetic flux generated by the coil is the same as a direction of magnetic flux of the magnet. Hereinafter, the principle when the energization pattern is determined in the stop position detection process will be described.

When driving of the brushless motor 1 in the stop state is started (started up), the rotation speed command signal is input from an outside to the control apparatus 11. This rotation speed command signal is, for example, a signal in which the rotation speed varies from zero to a certain rotation speed step by step. Thereby, the mode selection unit 40 causes the energization pattern determination unit 26 to select the stop position detection mode 26A.

The stop position detection mode 26A of the energization pattern determination unit 26 outputs a command to the excitation signal output unit 27 so that six predetermined energization patterns for the stop position determination is continued only for a time for which the rotor does not rotate. The time for which the rotor does not rotate, although it may differ according to the inertia of the brushless motor 1, is, for example, between several microseconds and several milliseconds. This energization time is counted by the counter 29B of the current applied time measurement unit 29. The excitation signal output unit 27 outputs a PWM signal corresponding to an energization pattern to the inverter circuit 13. ON and OFF are switched in correspondence with the PWM signal, and the switching elements 40UH to 40WL perform energizing for coils of two phases among the coils of three phases.

At this time, the stop position detection mode 26A uses a predetermined duty ratio as a duty ratio of a PWM signal. This duty ratio is defined based on a maximum current value indicating a value of a current capable of being stably supplied by the power supply apparatus 20 and a value of a magnetic saturation current, which is a current that flows when magnetic saturation occurs in the brushless motor 1. Specifically, a duty ratio satisfying the following Expression (1) is used.

$$\text{(Magnetic Saturation Current Value)} \geq ((\text{Maximum Current Value})/(\text{Duty Ratio})) \quad (1)$$

Here, $0 < (\text{Duty Ratio}) \leq 1$.

FIGS. 5A to 5F are schematic diagrams illustrating the above-described six energization patterns for the stop position determination. As illustrated in FIGS. 5A to 5F, these energization patterns #1 to #6 are patterns in which the brushless motor 1 can be driven.

Figure 5A:
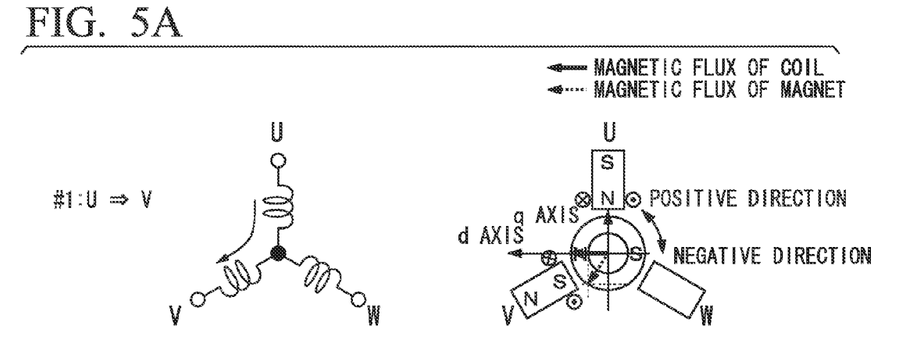
FIG. 5A is a schematic diagram illustrating one of six energization patterns for a stop position determination.

In the energization pattern #1, a current flows from the U-phase coil U to the V-phase coil V. North (N)-pole magnetization is made in the U phase and south (S)-pole magnetization is made in the V phase.

Figure 5B:
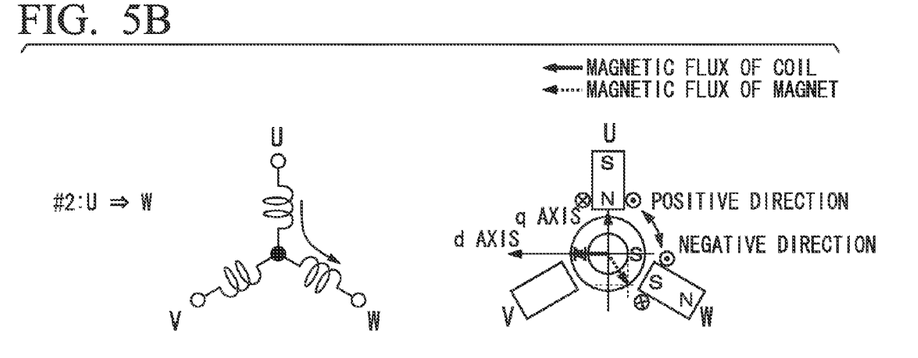
FIG. 5B is a schematic diagram illustrating one of the six energization patterns for the stop position determination.

In the energization pattern #2, a current flows from the U-phase coil U to the W-phase coil W. N-pole magnetization is made in the U phase and S-pole magnetization is made in the W phase.

Figure 5C:
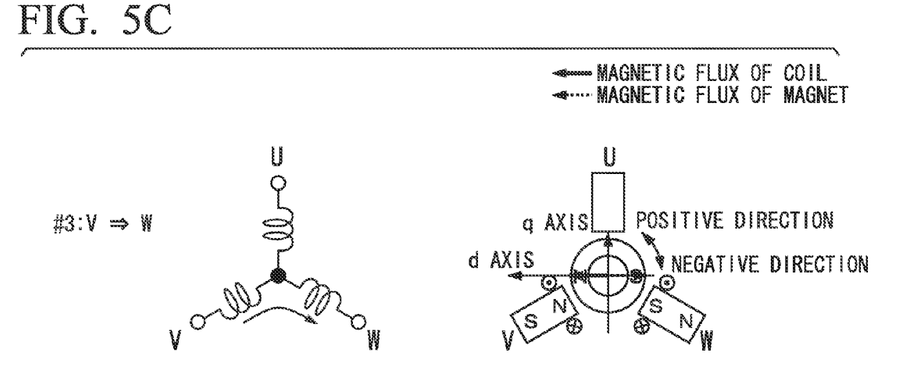
FIG. 5C is a schematic diagram illustrating one of the six energization patterns for the stop position determination.

In the energization pattern #3, a current flows from the V phase to the W phase. N-pole magnetization is made in the V phase and S-pole magnetization is made in the W phase.

Figure 5D:
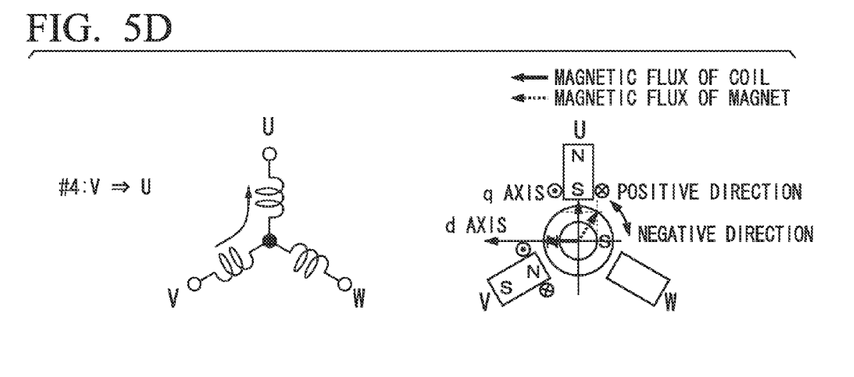
FIG. 5D is a schematic diagram illustrating one of the six energization patterns for the stop position determination.

In the energization pattern #4, a current flows from the V phase to the U phase. N-pole magnetization is made in the V phase and S-pole magnetization is made in the U phase.

Figure 5E:
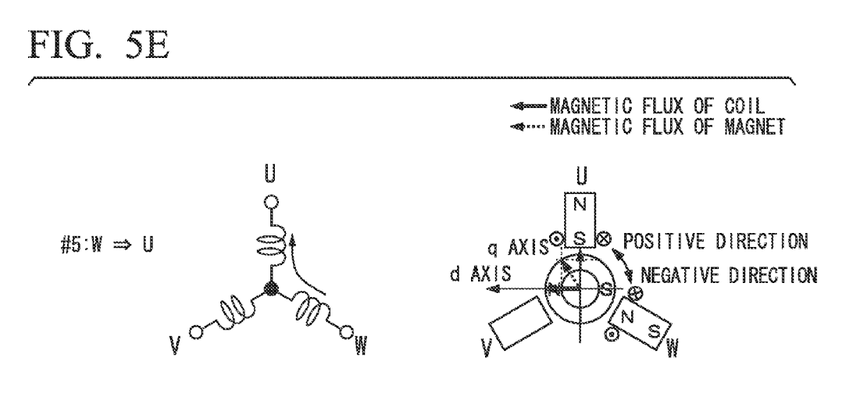
FIG. 5E is a schematic diagram illustrating one of the six energization patterns for the stop position determination.

In the energization pattern #5, a current flows from the W phase to the U phase. N-pole magnetization is made in the W phase and S-pole magnetization is made in the U phase.

Figure 5F:
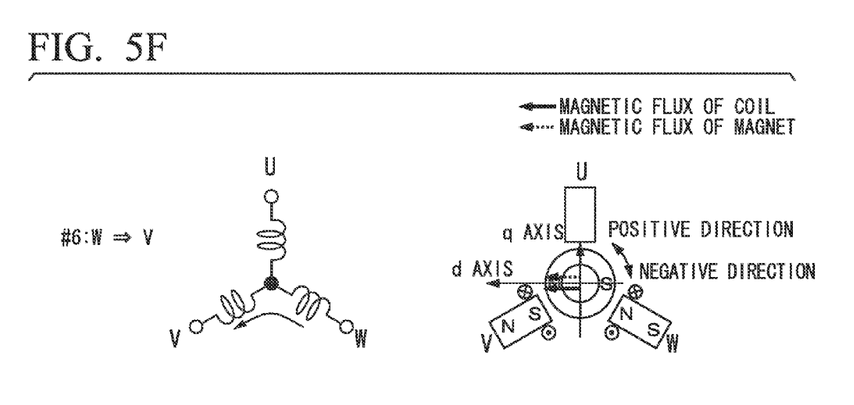
FIG. 5F is a schematic diagram illustrating one of the six energization patterns for the stop position determination.

In the energization pattern #6, a current flows from the W phase to the V phase. N-pole magnetization is made in the W phase and S-pole magnetization is made in the V phase.

Figure 6:
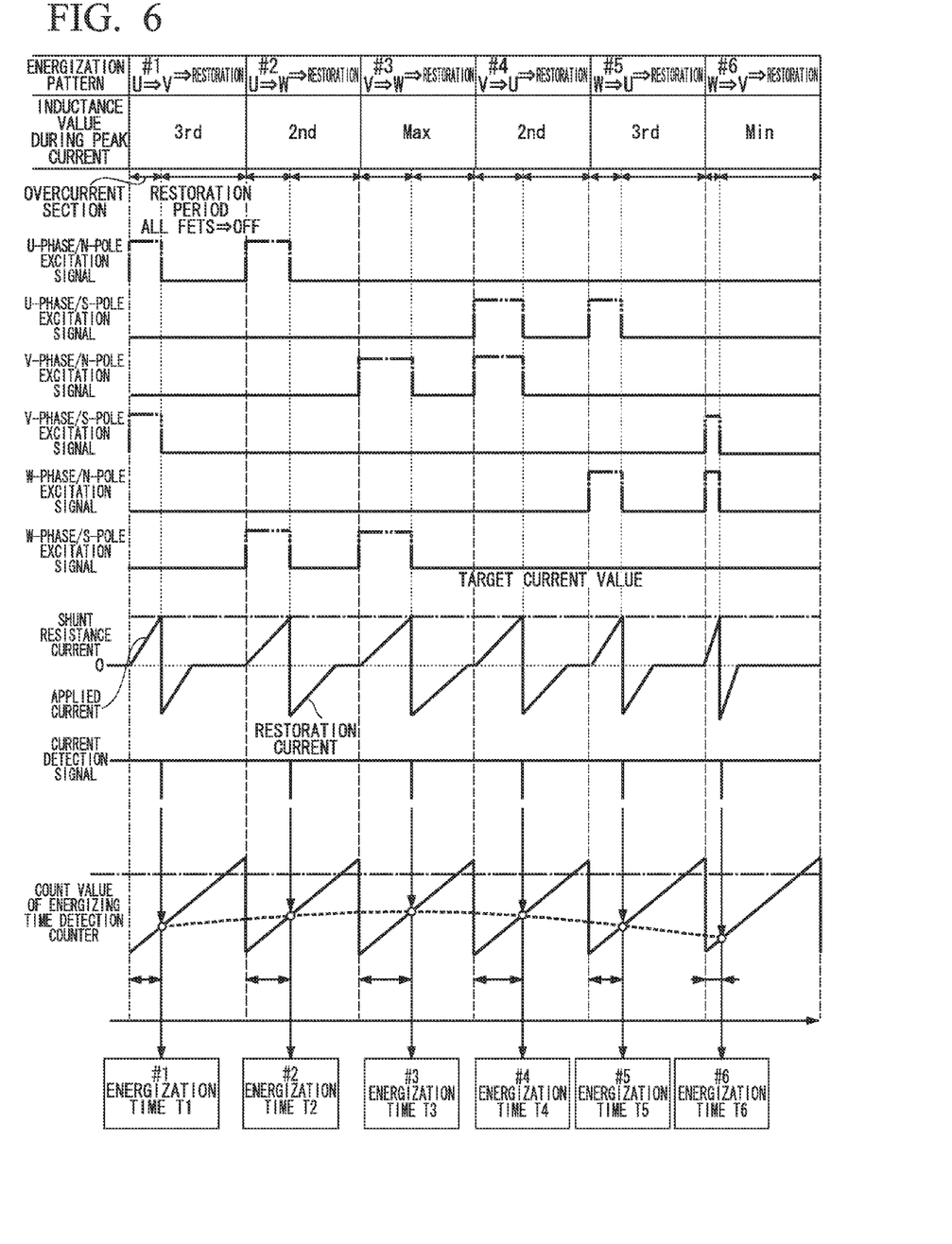
FIG. 6 is a waveform diagram illustrating an example of stop position detection according to this embodiment.

FIG. 6 is a waveform diagram illustrating an example of stop position detection according to the present embodiment. As illustrated in FIG. 6, the stop position detection mode 26A is performed by sequentially performing energizing corresponding to the energization patterns #1 to #6 in a rotor stop position detection process.

For example, in the energization pattern #1, energizing from the U phase to the V phase is performed, and then a regeneration period is provided. That is, a PWM signal having a duty ratio that satisfies Expression (1) is input to the switching element 40UH and the switching element 40VL, the coil U is subjected to N-pole magnetization, and the coil V is subjected to S-pole magnetization. At this time, a current flows from the coil U to the coil V and then, a current, according to current flows from the coil U to the coil V, flows through the shunt resistor 13A. A current that flows through the shunt resistor 13A is a phase current applied to the brushless motor 1 through the power supply apparatus 20, and increases gradually along with the passage of time.

If the phase current reaches a predetermined target current value, the transition to a regeneration period is taken by ending an energizing section. At this time, if a voltage between both ends of the shunt resistor 13A is equal to or greater than a target voltage, the current detection circuit 38 that monitors a voltage value of the shunt resistor 13A outputs a low-level signal as a current detection signal. Because a voltage corresponding to the target current value is set for the target voltage as described above, the phase current flowing through the brushless motor 1 is equal to or greater than the target current value if the voltage between both of the ends of the shunt resistor 13A is equal to or greater than the target voltage. If the current detection signal has the low level, the PWM signal has the low level through the overcurrent protection circuit 39 and the switching elements 40UH, 40VH, and 40WH are turned off (hardware limit).

Further, at the same time, the control apparatus 11 ends energizing of the energization pattern #1 by executing an interrupt process when detecting a falling edge of the current detection signal (software limit). Thereby, a current flowing through the brushless motor 1 becomes zero. Because the occurrence of the software limit is delayed, the current is quickly set to zero in combination with the hardware limit.

The stop position detection mode 26A of the energization pattern determination unit 26 causes the overcurrent protection unit 32 to select the stop position detection mode 32A. In addition, if the stop position detection mode 26A causes energizing of each coil to be started, the stop position detection mode 32A causes the counter 29B of the current applied time measurement unit 29 to start a count-up operation. Thereafter, if the current detection signal is input from the current detection circuit 38 to the counter 29B via the stop position detection mode 32A of the overcurrent protection unit 32, the counter 29B causes the count value to be stored as an energization time T1 corresponding to the energization pattern #1 (FIG. 5A) at that time.

In order to set a current flowing through the brushless motor 1 to zero, all FETs of the inverter circuit 13 are turned off. At this time, because power accumulated in the coil becomes a regeneration current, which flows through a circuit returning to the coil via a body diode of the FET, the power supply apparatus 20, and the shunt resistor 13A, the current becomes negative. The restoration current becomes zero with the passage of time as illustrated in a current waveform of the shunt resistor 13A.

The stop position detection mode 26A of the energization pattern determination unit 26 outputs a command signal for energizing of the energization pattern #2, if the stop position detection mode 26A of the energization pattern determination unit 26 receives a signal from the counter 29B when a predetermined time has elapsed after a command signal for energizing of the energization pattern #1 has been output. The predetermined time is set to a sufficient value as a time required until a regeneration current flowing through the brushless motor 1 becomes zero after the phase current has reached the target current value. In the counter 29B, a count value corresponding to the predetermined time is set as a threshold value for clearing the count value. Thus, a value of the counter 29B is reset at a timing at which the energization pattern is switched.

The predetermined time is set to a sufficient value as the time required until the regeneration current flowing through the brushless motor 1 becomes zero after the phase current has reached the target current value. When the time until the target current value is reached is measured (as the measurement result of the storage unit 29A) after a current is applied to the brushless motor 1, the predetermined time may be the same as the measured time. In this case, every time the storage unit 29A stores an energization time, a count value corresponding to a time until the counter 29B is reset is passed to the counter 29B. That is, a predetermined time signal may be transmitted from the storage unit 29A to the counter 29B.

Thereafter, likewise, energizing corresponding to the energization patterns #2 to #6 is performed in the stop position detection mode 26A of the energization pattern determination unit 26. At this time, the current applied time measurement unit 29 measures energization times T2 to T6 (count values) corresponding to each of the energization patterns, and stores the measured energization times T2 to T6.

Here, the count value stored in the storage unit 29A varies with a rotor stop position.

In an energization pattern corresponding to the rotor stop position, a magnetic flux most easily flows and the time until the target current value is reached is shortened. In an example illustrated in FIG. 6, the count value of the energization pattern #3 is largest, the count values of the energization patterns #2 and #4 adjacent to the energization pattern #3 are second largest, and the count value of the energization pattern #6 is smallest. Therefore, the rotor stops in a position corresponding to the energization pattern #6.

According to the above-described characteristics, in the control apparatus 11, the rotor stop position estimation unit 31 compares the energization times T1 to T6 stored in the storage unit 29A of the current applied time measurement unit 29, selects an energization pattern corresponding to a smallest energization time among the energization times T1 to T6, and estimates that the rotor stops in a position corresponding to the selected energization pattern.

In the start-up excitation mode 26C of the energization pattern determination unit 26 executed after the rotor stop position has been estimated, an energization pattern having a phase advanced 120 degrees in a rotation direction from the energization pattern having the smallest energization time among six types of energization times is selected as an energization pattern on start-up.

Hereinafter, the processes of step S104, S106, S018, S110, and S112 will be specifically described.

Figure 7:
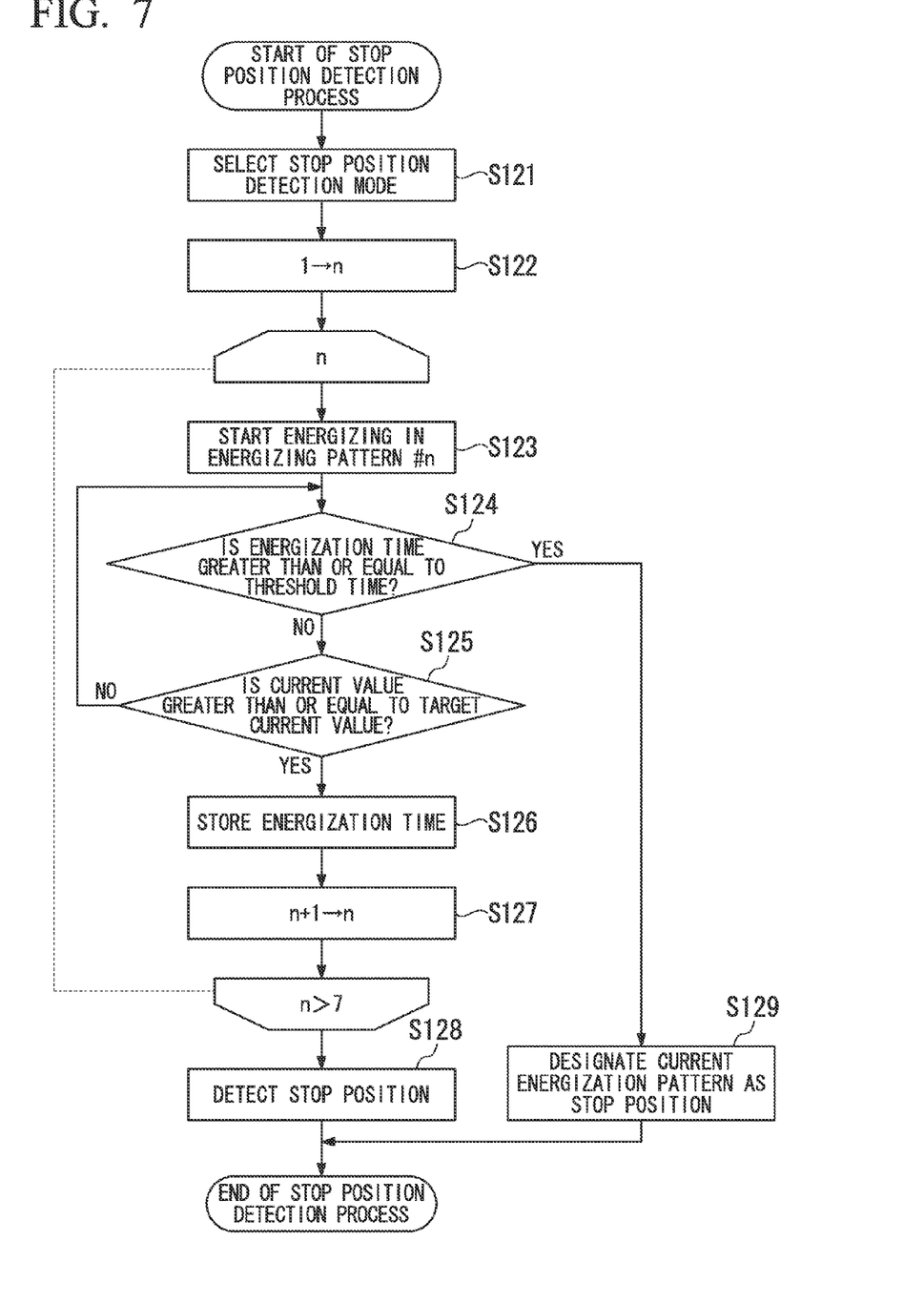
FIG. 7 is a flowchart illustrating a stop position detection process of step S104.

FIG. 7 is a flowchart illustrating the stop position detection process of step S104.

The stop position detection mode 26A of the energization pattern determination unit 26 causes the overcurrent protection unit 32 to select the stop position detection mode 32A (step S121), and substitutes "1" for a variable n (step S122). The stop position detection mode 26A causes the excitation signal output unit 27 and the PWM duty output unit 28 to control an operation of energizing the brushless motor 1 in the energization pattern #n (step S123). At this time, the counter 29B of the current applied time measurement unit 29 starts a count operation.

The stop position detection mode 26A determines whether or not the count value (energization time) of the counter 29B is equal to or greater than a threshold time (step S124). When the count value is greater than or equal to the threshold time (step S124: YES), the stop position detection mode 26A designates a position corresponding to the current energization pattern #n as a stop position of the rotor (step S129), and the stop position detection process ends.

When the count value is equal to or greater than the threshold time in step S124 (step S124: NO), the stop position detection mode 26A determines whether or not a phase current flowing through a coil of the brushless motor 1 is equal to or greater than a target current value (step S125). When the phase current is not equal to or greater than the target current value (step S125: NO), the stop position detection mode 26A returns to the process of step S124.

On the other hand, when the phase current is equal to or greater than the target current value (step S125: YES), the counter 29B causes the storage unit 29A to store an energization time Tn corresponding to an energization pattern #n (step S126). If the energization time Tn corresponding to the energization pattern #n is stored in the storage unit 29A, the stop position detection mode 26A increases a value of the variable n is by "1" (step S127). In the stop position detection mode 26A, the process from step S123 to step S127 is repeated until the variable n is greater than "7."

If the above-described process from step S123 to step S127 is repeated six times, that is, if the energization times T1 to T6 are measured, the stop position detection mode 26A designates a position estimated by the rotor stop position estimation unit 31 as a stop position of the rotor (step S128), and the stop position detection process ends.

In the pull-in process of step S106, the pull-in excitation mode 26B causes the excitation signal output unit 27 and the PWM duty output unit 28 to control an operation of outputting a PWM signal corresponding to an energization pattern corresponding to the stop position of the rotor detected by the stop position detection mode 26A. Thereby, the rotor is pulled to the position detected by the stop position detection mode 26A.

In the start-up excitation process of step S108, the start-up excitation mode 26C selects an energization pattern in which a maximum torque is generated for the stop position of the rotor detected by the stop position detection mode 26A, and causes the excitation signal output unit 27 to output a signal corresponding to the above-described energization pattern. At this time, the start-up excitation mode 26C causes the excitation signal output unit 27 to output a signal corresponding to a selected energization pattern during a predetermined initial energization time Ts1.

Figure 8:
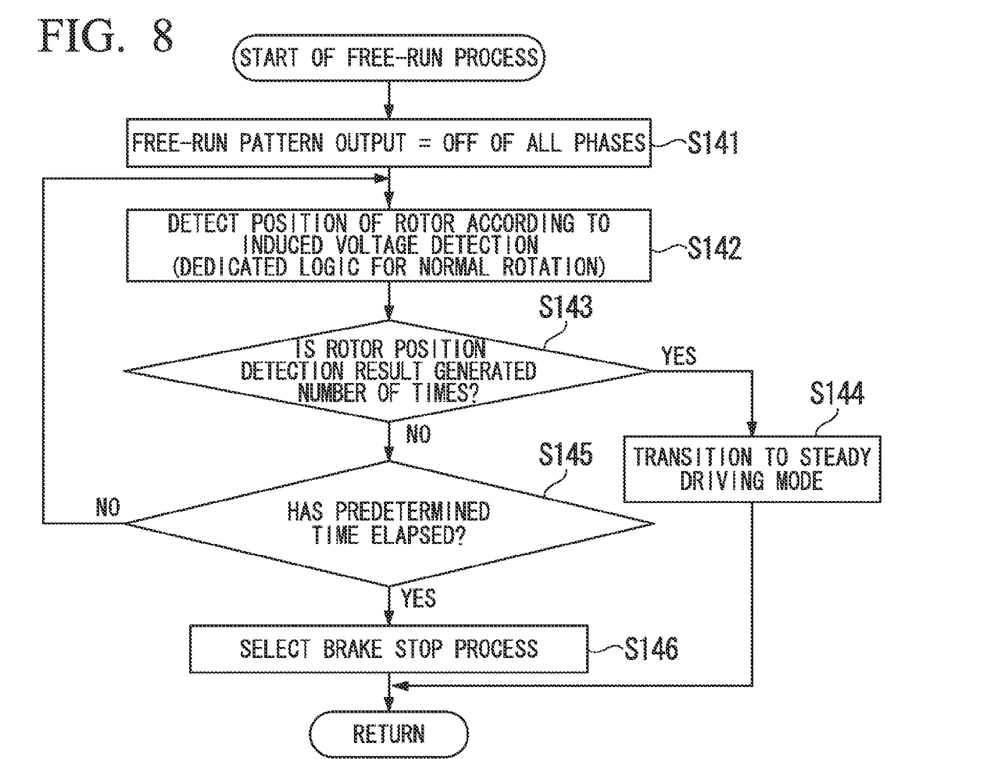
FIG. 8 is a flowchart illustrating a free-run control process of step S110.

FIG. 8 is a flowchart illustrating the free-run control process of step S110.

The free-run control mode 26D of the energization pattern determination unit 26 causes the excitation signal output unit 27 and the PWM duty output unit 28 to control an operation of outputting a signal corresponding to an energization pattern for turning off energizing of the coils U, V, and W of each phases as an energization pattern corresponding to the free-run (step S141).

According to a torque applied to the rotor in the start-up excitation process, the excitation switching timing calculation unit 22 detects a position of the rotor from an induced voltage generated while the rotor runs freely with inertia (step S142).

The excitation switching timing calculation unit 22 determines whether or not the number of detections of the position of the rotor has reached the predetermined number of times (step S143). When the number of detections has reached the predetermined number of times (step S143: YES), the excitation switching timing calculation unit 22 causes the energization pattern determination unit 26 to select the steady excitation mode 26E and execute the energization pattern determination unit 26 to perform sensorless driving (a steady excitation process) by the induced voltage (step S144).

On the other hand, when the number of detections has not reached the predetermined number of times (step S143: NO), the excitation switching timing calculation unit 22 determines whether or not a predetermined time has elapsed from a free-run start (step S145). The excitation switching timing calculation unit 22 repeats the process from step S142 to step S145 until the predetermined time has elapsed.

When the predetermined time has elapsed (step S145: YES), the excitation switching timing calculation unit 22 causes the energization pattern determination unit 26 to select the brake stop mode 26F and perform brake energizing (step S146).

In the steady excitation process of step S112, the energization pattern is switched in the order in which the rotor of the brushless motor 1 rotates in a predetermined rotation direction according to a timing at which an excitation pattern is switched calculated by the excitation switching timing calculation unit 22 in the steady excitation mode 26E. Thereby, the control apparatus 11 performs sensorless driving for the brushless motor 1.

In the brake stop process of step S113, a switch is switched to a pattern in which the rotor stops for each switching element of the inverter circuit 13, and the above-described pattern is maintained until a predetermined fixed time has elapsed in the brake stop mode 26F. Here, when a time required until the rotor of the brushless motor 1 stops is pre-measured, the fixed time is defined based on the measurement result.

In the driving apparatus 2 according to the present embodiment, in detection of a position at which the rotor stops, the energization pattern determination unit 26 provided in the control apparatus 11 causes the excitation signal output unit 27 and the PWM duty output unit 28 to control an operation of sequentially performing energizing corresponding to each energization pattern. At this time, a duty ratio at which ON and OFF of each switching element of the inverter circuit 13 are switched corresponds to a value of a maximum current capable of being supplied by the power supply apparatus 20. Specifically, the duty ratio is defined to satisfy Expression (1).

Thereby, when a position at which the rotor stops is detected if driving of the motor is started, a load on the power supply apparatus 20 can be reduced to a fixed level or less, and stability of the power supply apparatus 20 can be maintained. As a result, it is possible to prevent a voltage of power supplied by the power supply apparatus 20 from being temporarily reduced. In addition, if the power supply apparatus 20 supplies power to other equipment, an influence on the other equipment can be suppressed when driving of the brushless motor 1 is started.

In addition, in the driving apparatus 2 in the present embodiment, when the position at which the rotor stops is detected the energization pattern determination unit 26 provided in the control apparatus 11 designates a position corresponding to the energization pattern as the position at which the rotor stops if a threshold time or more has elapsed until a value of a phase current flowing through the coil reaches a target current value in energizing using each energization pattern (step S129 in FIG. 7). This is because the current value may not reach the target current value in a state in which magnetic saturation does not occur due to movement of the rotor when the current value of the phase current flowing through the coil within the threshold time from the start of energizing does not reach the target current value. In this case, it is possible to reliably determine the position of the rotor by performing the pull-in process using a position corresponding to an energization pattern used for energizing as the position of the rotor because the rotor moves.

Thereby, it is possible to shorten a time required for the stop position detection process and also estimate a position at which the rotor stops to start driving of the brushless motor 1 even when the current value does not reach the target current value within the threshold time. In addition, if the power supply apparatus 20 is a storage battery and is deteriorated, or if wiring resistance of a wiring for connecting the inverter circuit 13, the brushless motor 1, and the power supply apparatus 20 is high, it is possible to estimate the position at which the rotor stops to start the driving of the brushless motor 1 even when the current value does not reach the target current value with the threshold time.

In addition, if the duty ratio is less than 100% when energizing corresponding to each energization pattern is performed, an energization time is long. Thus, a torque generated by energizing before each coil reaches magnetic saturation may be greater than a load of the brushless motor 1. In this case, it is not possible to detect the position of the rotor even when energizing corresponding to the energization patterns #1 to #6 is repeated. However, when energizing is performed for the threshold time or more in the driving apparatus 2 according to the present embodiment, the position of the rotor can be estimated according to energizing and the driving of the brushless motor 1 can be started.

A method of starting driving of the brushless motor 1 after a rotor stop position is detected or a driving method when the brushless motor 1 is caused to perform steady rotation is not limited to the embodiment. In addition, although the case in which the position of the rotor of the brushless motor 1 is detected has been described in the present embodiment, a control target of the control apparatus 11 is not limited to the brushless motor 1, and may be an induction motor or a synchronous motor without a commutator.

Although the predetermined embodiments of the present invention have been described above, the invention is not limited to these embodiments. Any additions, omissions, substitutions and other modifications of configurations can be made without departing from the scope of the present invention. The invention is not to be considered as being limited by the foregoing description, and is only limited by the scope of the appended claims.

The invention claimed is:

1. A driving apparatus, which drives a motor by supplying power from a power supply apparatus to the motor having a stator around which a plurality of coils are wound and a rotor, comprising:
   an inverter unit, having a switching element provided for each coil, configured to energize the coil by switching ON and OFF of the switching element;
   an energization pattern determination unit configured to select from a plurality of energization patterns one by one, each of which indicates a direction of a current that flows through the coil, when driving of the motor is started, and energizing the coil by switching ON and OFF of the switching element based on a selected energization pattern at a duty ratio corresponding to a value of a maximum current capable of being supplied by the power supply apparatus only for a time for which the rotor does not rotate;
   a current applied time measurement unit configured to measure an energization time, which is a time until a value of the current flowing through the coil reaches a predetermined target current value for each energization pattern; and
   a rotor stop position estimation unit configured to:
      compare a plurality of energization times corresponding to the plurality of energization patterns, which are measured by the current applied time measurement unit,
      select an energization pattern corresponding to a smallest energization time among the plurality of energization times, and
      estimate that the rotor stops at a position corresponding to the selected energization pattern corresponding to the smallest energization time.

2. The driving apparatus according to claim 1, wherein the duty ratio is a ratio of the target current value to the maximum current value of the power supply apparatus.

3. The driving apparatus according to claim 1, wherein the target current value is a value of a current that flows when magnetically saturation is occurred at the coil.

4. The driving apparatus according to claim 2, wherein the target current value is a value of a current that flows when magnetically saturation is occurred at the coil.

5. The driving apparatus according to claim 1, wherein the energization pattern determination unit designates a position corresponding to the selected energization pattern as the position at which the rotor stops when a time elapsed after energizing of the coil is started using the selected energization pattern is equal to or greater than a predetermined time.

6. The driving apparatus according to claim 2, wherein the energization pattern determination unit designates a position corresponding to the selected energization pattern as the position at which the rotor stops when a time elapsed after energizing of the coil is started using the selected energization pattern is equal to or greater than a predetermined time.

7. The driving apparatus according to claim 3, wherein the energization pattern determination unit designates a position corresponding to the selected energization pattern as the position at which the rotor stops when a time elapsed after energizing of the coil is started using the selected energization pattern is equal to or greater than a predetermined time.

8. A stop position detection method for use in a driving apparatus, which drives a motor by supplying power from a power supply apparatus to the motor having a stator around which a plurality of coils are wound and a rotor, and has an inverter unit, having a switching element provided for each coil, for energizing the coil by switching ON and OFF of the switching element, comprising:
   an energizing step of selecting from a plurality of energization patterns, each of which indicates a direction of a current that flows through the coil, one by one when driving of the motor is started, and energizing the coil by switching ON and OFF of the switching element based on a selected energization pattern at a duty ratio corresponding to a value of a maximum current capable of being supplied by the power supply apparatus only for a time for which the rotor does not rotate;
   a current applied time measurement step of measuring an energization time, which is a time until a value of the current flowing through the coil reaches a predetermined target current value for each energization pattern; and
   a rotor stop position estimation step of:
      comparing a plurality of energization times corresponding to the plurality of energization patterns, which are measured in the current applied time measurement step,
      selecting an energization pattern corresponding to a smallest energization time among the plurality of energization times, and
      estimating that the rotor stops at a position corresponding to the selected energization pattern corresponding to the smallest energization time.

* * * * *